United States Patent [19]

Kennon

[11] E Patent Number: Re. 31,867

[45] Reissued Date of Patent: Apr. 16, 1985

[54] ELECTROSTATIC SPRAY GUN

[75] Inventor: James L. Kennon, Avon, Ohio

[73] Assignee: Nordson Corporation, Amherst, Ohio

[21] Appl. No.: 357,403

[22] Filed: Mar. 12, 1982

Related U.S. Patent Documents

Reissue of:

[64] Patent No.: 4,182,490
Issued: Jan. 8, 1980
Appl. No.: 877,445
Filed: Feb. 13, 1978

[51] Int. Cl.[3] ..... B05B 5/02

[52] U.S. Cl. ..... 239/3; 239/691

[58] Field of Search ..... 239/3, 690–708

[56] References Cited

U.S. PATENT DOCUMENTS

| | | | |
|---|---|---|---|
| 2,989,241 | 6/1961 | Badger | 239/703 |
| 3,169,882 | 2/1965 | Juvinall et al. | 239/707 |
| 3,233,831 | 2/1966 | Fraser | 239/15 |
| 3,292,860 | 12/1966 | Williams et al. | 239/707 |
| 3,459,374 | 8/1969 | Probst | 239/707 |
| 3,635,400 | 1/1972 | Nord et al. | 239/706 |
| 3,677,470 | 7/1972 | Probst et al. | 239/707 |
| 3,747,850 | 7/1973 | Hastings et al. | 239/3 |
| 3,794,243 | 2/1974 | Tamny et al. | 239/3 |
| 3,815,820 | 6/1974 | Probst | 239/707 |
| 3,938,740 | 2/1976 | Bertilsson et al. | 239/3 |
| 4,163,520 | 8/1979 | Garcin et al. | 239/707 |

FOREIGN PATENT DOCUMENTS

| | | | |
|---|---|---|---|
| 2048639 | 4/1972 | Fed. Rep. of Germany | 239/691 |

*Primary Examiner*—Andres Kashnikow
*Assistant Examiner*—Michael J. Forman
*Attorney, Agent, or Firm*—Wood, Herron & Evans

[57] ABSTRACT

An electrostatic spray gun is disclosed which comprises a high valued resistance in the barrel portion of the gun, and a second resistor in the nozzle of the gun closely adjacent to a charging electrode projecting from the nozzle to provide safer operation.

29 Claims, 2 Drawing Figures

ELECTROSTATIC SPRAY GUN

Matter enclosed in heavy brackets [ ] appears in the original patent but forms no part of this reissue specification; matter printed in italics indicates the additions made by reissue.

FIELD OF THE INVENTION

This invention relates to electrostatic spray guns, and more particularly relates to safety aspects of electrostatic spray guns designed for use in flammable atmospheres.

BACKGROUND OF THE INVENTION

Electrostatic spray coating is an established art. In general coating material is projected toward an object to be coated in an atomized or particulate form from a dispensing device. The object to be coated is held at electrically ground potential and either just before, at, or just after being dispensed from the gun, the coating material is imparted an electrical charge so that it will be electrostatically attracted toward the object to be coated.

Because of the high voltage, certain safety precautions must be observed in the construction and operation of an electrostatic coating device. For example, when spraying many of the coating materials in use today, including the powders, a flammable atmosphere results in the area of the coating operation. If the electrostatic charging circuit associated with the spray guns is brought too closely to any grounded object, the possibility arises that a spark will jump between the high voltage circuit in the gun, and the grounded object. If there is sufficient energy in the arc thus produced, there is a possibility of igniting the flammable atmosphere in the coating area. The energy required for ignition may vary depending on the composition of the coating material, and the ratio of the material with respect to the air in the coating area. In order to reduce the amount of energy in a potential arc from the electrostatic charging system of the gun, high value resistors have been employed in the barrel of the gun. The resistors used in electrostatic spray guns operate to limit the current and thus lower electrical energy available to an arc. In order for the resistor to be effective however, the current must pass through it. Thus, current resulting from energy capacitively stored "downstream" of the resistor, is not limited by the resistor.

In general, previous designs of electrostatic guns incorporated the resistors in the barrel portion of the gun. Therefore, in electrostatic spray guns having a charging mechanism in the nozzle, energy was capacitively stored downstream of the resistor in the nozzle, and this energy was available to feed an arc. The amount of this capacitively stored energy increases as the square of the voltage. Therefore, guns of previous design had to be operated at lower voltages to result in safe energy storage levels downstream of the resistor. Lower operating voltages contribute to less than desirable coating characteristics and lower deposition efficiency.

The electrostatic spray gun comprised of the present invention has an improved high voltage charging circuit which results in safer operation without any appreciable degradation in efficiency while still allowing the use of a preferred electrostatic charging configuration. In the present design a second resistor is included in the nozzle portion of the gun so as to leave very little conductive material "downstream" of resistors.

The gun comprises a barrel portion with a high voltage electrical path in it with a resistor comprising part of the electrical path in the barrel. Attached to the barrel is a nozzle portion made from substantially non-conductive material, having a fluid passage ending in a discharge orifice, a high voltage electrical path therein and a thin wire-like electrode extending therefrom. The electrode is a conductive wire in contact with the electrical path in the nozzle and is made to have a small electrical capacitance. The electrode can be located close to or in the stream of fluid being discharged from the nozzle. The electrical path inside of the nozzle portion connects the electrode to the electrical path in the barrel and also comprises a resistor. This small resistor in the nozzle and the resistor in the barrel combine to effectively damp out or dissipate the stored energy resulting from the electrical circuit downstream of the large droping resistor in the barrel except for a small amount due to the electrode itself. Thus, it has been discovered that a smaller valued resistor can be used in the nozzle portion of the gun in conjunction with a high megohm resistor in the barrel portion of the gun to result in a safer gun at any given operating voltage, and a gun capable of use at higher voltages for any given safety margin.

The particular configuration of the gun facilitates ease of manufacture and assembly, good wear characteristics and constancy of the high voltage electrical characteristics of the gun.

BRIEF DESCRIPTION OF THE DRAWING

The invention can be more fully appreciated by reference to the drawing figures in which.

DESCRIPTION OF THE PREFERRED EMBODIMENT

Figure 1:
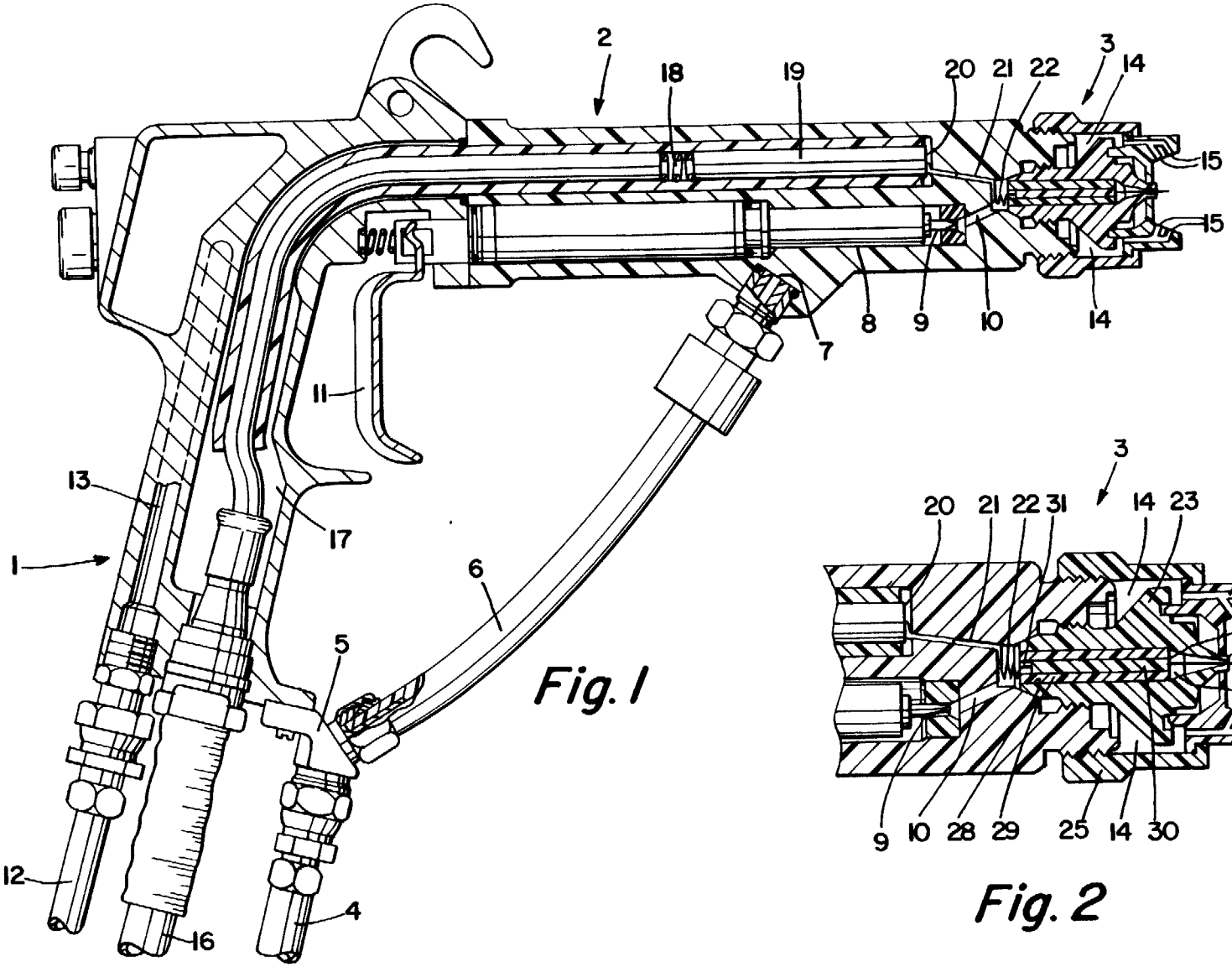
FIG. 1 is a partially cross sectional view of an electrostatic spray gun incorporating the present invention.

FIG. 1 depicts an air-atomizing electrostatic spray gun having a metallic, electrically grounded handle portion 1 to which is attached an electrically non-conductive barrel portion 2. A nozzle portion 3 is connected to a forward end of the barrel 2. Coating material is supplied to the gun by a hydraulic hose 4 adapted to be connected to a source of pressurized coating material (not shown).

The hose 4 is connected to an electrically conductive lug 5 attached to the butt end of the handle 1 and having a fluid passage through it so as to connect a fluid passage in the hose 4 to a fluid passage in a hose 6 connected between the lug 5 and an inlet passage 7 in the side of the barrel 2. The inlet passage 7 through the side of the barrel 2 communicates with a first fluid passage 8 in the barrel 2. A needle and seat valve assembly 9 toward the front of the gun is effective to control the flow of fluid from the first fluid passage 8 into a second fluid passage 10. The second fluid passage 10 is adapted to be connected to a fluid passage 28 (FIG. 2) in the nozzle 3. A trigger assembly 11 is effective to operate the needle and seat valve assembly 9.

An air hose 12 is connected to the butt end of the handle 1 by suitable couplings, and communicates with an air passage 13 in handle 1 of the gun. The air passage 13 continues in a plane other than that shown in the figure and eventually communicates with an air chamber 14 in the nozzle portion 3 of the gun.

Figure 2:
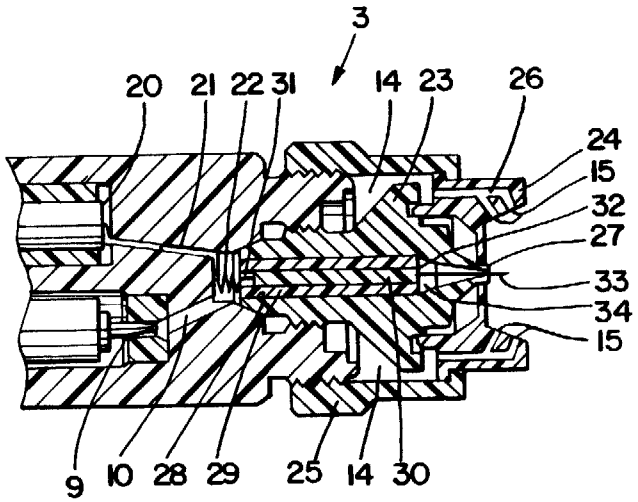
FIG. 2 is a detailed view of the nozzle portion of the gun of FIG. 1.

A high voltage cable 16 also connects into the butt of the handle 1 and continues through the handle 1 through a passage 17 which extends into the barrel 2. An electrically conductive spring 18 is compressed between the end of the high voltage cable 16 and a resistor 19. The spring 18 serves to provide electrical connection between the end of the cable 16 and the resistor 19. The resistor 19 is generally on the order of 75 megohms, but can be more or less depending on the voltage being supplied through cable 16 to the gun. Referring briefly to FIG. 2, a forward end 20 of the resistor 19 is connected, by means of a small electrical conductor 21, to a spring 22 in contact with a resistor 30 in the nozzle 3.

The general construction of the gun except for the nozzle 3 can be like that described in the Hastings et al. U.S. Pat. No. 3,747,850 or Tamny et al. U.S. Pat. No. 3,794,243, both patents being owned by the assignee of the present invention. To that extent, these patents are incorporated herein by reference.

Turning now to FIG. 2 the details of the nozzle 3 can be observed. The nozzle portion 3 of the gun comprises a fluid nozzle 23, an air horn 24, and retaining nut 25. These parts 23, 24, 25 are made from electrically non-conductive material such as a material sold under the DuPont Trademark "Delrin". The surface configuration of these components combine to form fluid and air passages in the nozzle 3 which will be described more fully below. The retaining nut 25 is effective to hold the fluid nozzle 23 and air cap 24 onto the front end of the barrel 2. The retaining nut 25 is threadedly attached to the front end of the barrel 2 and engages a flange on the air cap 24. The air cap 24 is urged by the retaining nut 25 against the fluid nozzle 23 so as to hold the fluid nozzle 23 securely onto the barrel 2 and to seal the fluid passage 10 in the barrel 2 into fluid communication to a fluid passage 28 in the fluid nozzle 23.

As was described above, the air conduit 13 in the handle 1 communicates with the air chamber 14 in the nozzle 3. The air chamber 14 is in communication with air passages 26 in the air cap 24. The air passages 26 terminate in outlet orifices 15 in the air cap 23. The air issuing from the orifices 15 is effective to atomize the coating material being discharged from the fluid nozzle 23 and to shape the atomized material into a given spray pattern. Centrally located of the air cap 24 is an opening 27 through which the forward, fluid-discharging end of the fluid nozzle 23 passes.

The fluid nozzle 23 has a passage 28 through it which communicates to a fluid chamber 34 toward its forward end. This chamber 34 is open to a discharge orifice at its forward end. The fluid passage 28 in the fluid nozzle 23 can be circular in cross section. A high megohm resistor 30 encased in a member 29 is located in the fluid passage 28 of the fluid nozzle 23. The member 29 is for chemical and abrasion protection of the resistor and can be made of a material sold under the DuPont Trademark "Teflon". The member 29 can be square in cross section (in a plane perpendicular to the plane of the figure) so as to combine with the circular shape of the passage 28 to provide flow of the coating material from the passage 10 in the barrel 2 to the discharge orifice of the fluid nozzle 23 at its forward end. The rearward end 31 of the resistor 30 is connected to a continuation of the spring 22.

The forward end 32 of the resistor 30 is electrically connected to a thin stainless steel wire electrode 33 extending through the fluid chamber 34 and out through the discharge orifice of the fluid nozzle 23. For example, in one preferred embodiment the electrode 33 is round having a diameter of 0.025 inches and a length of 0.69 inches. The electrode 33 protrudes beyond the end of the fluid nozzle 23 by 0.27 inches.

The resistor 30 in the nozzle 3 can be sealed into the Teflon member 29 by means of epoxy.

It can be seen that the nozzle is substantially non-conductive, "Delrin" and "Teflon" being substantially non-conductive materials, except for the electrode 33 itself. Thus, the amount of electrically conductive material in the forward portion of the gun "downstream" of the blocking resistor 30 in the nozzle 3 is only the electrode 33 itself. Thus, the conductor 21, and spring 22, are "upstream" from blocking resistor 30. Further, the electrically conductive material which would otherwise be required between the electrode 33 and the spring 22 has been eliminated and replaced by resistor 30. Thus, the electrically conductive components at the forward end of the gun have been greatly reduced so as to reduce the availability of capacitively stored energy undamped by a resistor.

The resistors 19 and 30 are commercially available. The values of the resistor 19 and 30 will depend on various factors. In an actual device designed for operation of 65 to 76 kv or more (open circuit) the resistor 19 in the barrel 2 is 75 megohms, and the resistor 30 in the nozzle 3 is 12 megohms. In general, the combined resistance must be great enough to "damp" out the accumulated effects of the high voltage cable 16, the electrical components in the gun such as the springs, etc. The value of the resistor 30 in the nozzle 3 must be great enough to "damp" out the effects of electrical components between the resistor 19 in the barrel and the resistor 30 in the nozzle 3. The desired value can be selected by ignition tests well known to those skilled in the electrostatic spray coating art.

Thus, the design of this invention provides additional safety, without unduly enlarging the physical dimensions of the gun. The large resistor 19 combines with the smaller resistor 30 to damp out the effects of the cable, etc. The smaller resistor 30 in the nozzle 3 then damps out the effects of the electrically conductive components between the two resistors 19 and 30, leaving only a minimal amount of conductive material (the electrode 33) beyond the resistor 30.

Because of this design higher voltages can be safely utilized when operating the gun. Conversely, the gun has an improved safety margin at any given voltage. For example, two guns were compared. A first gun was identical to the gun described herein with a 75 megohm resistor in the barrel and a 12 megohm resistor in the nozzle. A second gun was identical to the first except that there was no resistor in the nozzle and the electrode length was increased so as to connect to the spring 22 at the rear of the nozzle. The second gun is capable of producing a tenth of a millijaule arc at 30–35 kv. The first gun did not produce a tenth of a millijaule arc until a voltage level of 55–60 kv. Thus, the added resistance in the nozzle of only 16% of the barrel resistance allows the operating voltage to be almost doubled for the same safety factor. Based on the same tests, it has been determined that the 16% increase in total gun resistance added in the nozzle removes about 67% of the energy available to an arc over a similar gun with only the resistor in the barrel. Although an air-atomizing device was described, it will be appreciated by those skilled in the art that this invention is equally applicable to other types of electrostatic spraying devices for example airless atomizing types, and even electrostatic powder applying devices.

Having described my invention I claim:

[1. An electrostatic coating apparatus comprising:

a nozzle portion made from substantially nonconductive material, having a fluid discharge opening and effective to project a dispersed cloud of coating material therefrom;

a small electrode extending from said nozzle portion;

a coating material conduit in communication with said fluid discharge opening;

a high voltage electrical path passing through the nozzle portion and adapted to connect said electrode to a source of high voltage electrical power; and at least a first series resistor in said electrical path located in said nozzle portion said first series resistor being in at least the megohm range.]

2. The apparatus of claim [1] *27* which further comprises a second series resistor in said electrical path located such that said first series resistor is located between said second series resistor and said electrode.

3. The apparatus of claim 2 wherein said first resistor has a smaller resistance value than said second resistor.

4. The apparatus of claim 2 wherein said apparatus is adapted to atomize liquid coating material, and which further comprises:

a barrel portion adapted to have said nozzle portion attached thereto, wherein said coating material conduit and said electrical path pass through said barrel portion to said nozzle portion and wherein said second resistor is located in said barrel portion.

5. The apparatus of claim 4 wherein said first resistor is smaller than said second resistor.

[6. The apparatus of claim 5 wherein the resistance of said first resistor is smaller than the resistance of said second resistor.]

7. An electrostatic coating apparatus comprising:

a barrel portion having a fluid conduit and a high voltage electrical path therein, one end of said fluid conduit being adapted to be connected to a source of fluid under pressure, and wherein one end of said electrical path is adapted to be connected to a source of high voltage electrical power and wherein a second end of said electrical path in said barrel is adapted to be connected to another electrical path;

a substantially non-conductive nozzle connected to said barrel and having a fluid conduit and high voltage electrical path therein and a thin electrode extending therefrom, said fluid conduit in said nozzle being in communication with said fluid conduit in said barrel and said electrical path in said nozzle having a first end connected to said electrode and a second end connected to said second end of said electrical path in said barrel, said electrical path in said nozzle comprising at least a first series resistor in the megohm range connected to said electrode.

8. The apparatus of claim 7 wherein said high voltage electrical path in said barrel comprises a series resistor having a larger resistance value than said first series resistance in said nozzle.

9. The apparatus of claim 8 wherein said electrode is approximately 0.69 inches in length, said first resistor has a value of approximately 12 megohms, and said second resistor has a value of approximately 75 megohms.

10. The apparatus of claim 9 wherein said electrode is approximately 0.025 inches in diameter.

11. The apparatus of claim 10 wherein one end of said electrode projects approximately 0.27 inches beyond the end of said nozzle.

12. The apparatus of claim 8 wherein said second resistor is axially positioned in a bore in said nozzle and secured therein by means of a spring type electrical connector.

13. The apparatus of claim 12 wherein said bore is the fluid conduit in said nozzle.

14. An electrostatic spray coating apparatus comprising:

a barrel portion having: a fluid conduit therein adapted to have one end connected to a source of fluid under pressure; and a first resistor in the megohm range in said barrel and having a first and second end, said first end being adapted to be connected to a source of high volage electrical power;

a removable air atomizing nozzle attached to said barrel portion and made from substantially nonconductive material, and having: a fluid discharge orifice; a fluid conduit in fluid communication with said orifice and with the fluid conduit in the barrel portion; and a thin electrode extending from said nozzle; and a second resistor located in said nozzle with one end connected to said electrode and the other end electrically connected to the second end of said first resistor.

15. The apparatus of claim 14 wherein the second resistor is located in the fluid conduit of the nozzle.

16. The apparatus of claim 15 wherein the resistor is sealed into a container chemically resistant and abrasion resistant to coating materials to be sprayed from said gun and with electrical connections for said second resistor at its ends, wherein the fluid in said conduit flows around the container.

[17. A method of electrostatic spray coating comprising the steps of:

dispensing a disperse coating material toward an object to be coated from a substantially electrically nonconductive nozzle;

imparting an electrical charge to said coating material by means of a small electrode extending from the nozzle;

supplying high voltage electrical power from an electrical power source to said electrode, sufficient to impart said charge to said coating material;

dissipating electrical energy supplied to said electrode through at least a first resistor in the megohm range located in said nozzle.]

18. The method of claim [17] *28* which further comprises the step of dissipating electrical energy supplied to said electrode through a second resistor located between said first resistor and said power source.

19. The method of claim 18 which further comprises the step of:

supplying said electrical power to said electrode through a barrel supporting said nozzle and locating said second resistor in said barrel.

20. The method of claim 19 wherein said first resistor has a resistance value of at least several megohms and said second resistor has a higher resistance value than said first resistor.

[21. A method of electrostatic spray coating comprising the steps of:

dispensing a disperse cloud of coating material toward an object to be coated from a substantially electrically non-conductive nozzle;

imparting an electrical charge to said coating material by means of a small electrode extending from the nozzle;

supplying high voltage electrical power to said electrode from an electrical power source sufficient to impart said charge on said coating material, through at least a first resistor in at least the megohm range located in said nozzle.]

22. The method of claim [21] *29* which further comprises the step of:

supporting said nozzle by means of a substantially electrically non-conductive barrel; and wherein the step of supplying said high voltage electrical power to said electrode further comprises the step of supplying said electrical power to said electrode through a second resistor located in said barrel, and having a larger resistance than said first resistor.

*23. The method of claim 20 in which:*

*said coating material is dispersed through a discharge opening in said nozzle and is charged by a thin electrode extending through said nozzle, said thin electrode constituting the only metal downstream of said first resistor.*

*24. The method of claim 20 in which:*

*said coating material flows around said first resistor.*

*25. An electrostatic coating apparatus comprising:*

*a barrel portion having a fluid conduit and a high voltage electrical path therein, one end of said fluid conduit being adapted to be connected to a source of fluid under pressure, one end of said electrical path being adapted to be connected to a source of high voltage electrical power, said electrical path including a first resistor in the megohm range disposed within said barrel;*

*a substantially nonconductive nozzle connected to said barrel and having a fluid discharge opening, a fluid conduit therein, said fluid conduit being in communication with said fluid conduit in said barrel and with said fluid discharge opening;*

*a thin electrode extending through said discharge opening;*

*a second electrical resistor disposed within said nozzle and in alignment with said discharge opening, said second resistor being in the megohm range and smaller than said first resistor, said second resistor being connected to said electrode and being in electrical connection with said first resistor, said second resistor being disposed downstream of all conductive material except the said thin electrode.*

*26. The electrostatic coating apparatus of claim 25 in which:*

*said second resistor is sealed by material which is chemical-resistant and abrasion-resistant to coating materials to be sprayed from said gun and is located within the fluid conduit in said nozzle, whereby the fluid in said conduit flows around said second resistor.*

*27. An electrostatic coating apparatus comprising:*

*a nozzle portion made from substantially nonconductive material, having a fluid discharge opening and effective to project a dispersed cloud of coating material therefrom;*

*a small electrode extending through said fluid discharge opening and forwardly from said nozzle portion;*

*a coating material conduit in communication with said fluid discharge opening;*

*a high voltage electrical path passing through the nozzle portion and adapted to connect said electrode to a source of high voltage electrical power; and*

*at least a first series resistor in said electrical path located in said nozzle portion directly behind said electrode and being connected thereto, said first series resistor being in at least the megohm range.*

*28. A method of electrostatic spray coating comprising the steps of:*

*dispensing a disperse coating material toward an object to be coated from a substantially electrically nonconductive nozzle;*

*imparting an electrical charge to said coating material by means of a small electrode extending from the nozzle, said electrode being disposed in the flow path of said coating material as it leaves the nozzle;*

*supplying high voltage electrical power from an electrical power source to said electrode, sufficient to impart said charge to said coating material;*

*dissipating electrical energy supplied to said electrode through at least a first resistor in the megohm range having one end connected to the electrode and being located in said nozzle and in the path of said coating material directly behind said electrode.*

*29. A method of electrostatic spray coating comprising the steps of:*

*dispensing a disperse cloud of coating material toward an object to be coated from a substantially electrically nonconductive nozzle;*

*imparting an electrical charge to said coating material by means of a small electrode extending from the nozzle, said electrode being disposed in the flow path of said coating material as it leaves the nozzle;*

*supplying high voltage electrical power to said electrode from an electrical power source sufficient to impart said charge on said coating material, through at least a first resistor in at least the megohm range having one end connected to the electrode and being located in said nozzle and in the flow path of said coating material directly behind said electrode.*

* * * * *